(No Model.) 5 Sheets—Sheet 1.
J. T. HESS.
CORN HARVESTER.
No. 479,165. Patented July 19, 1892.
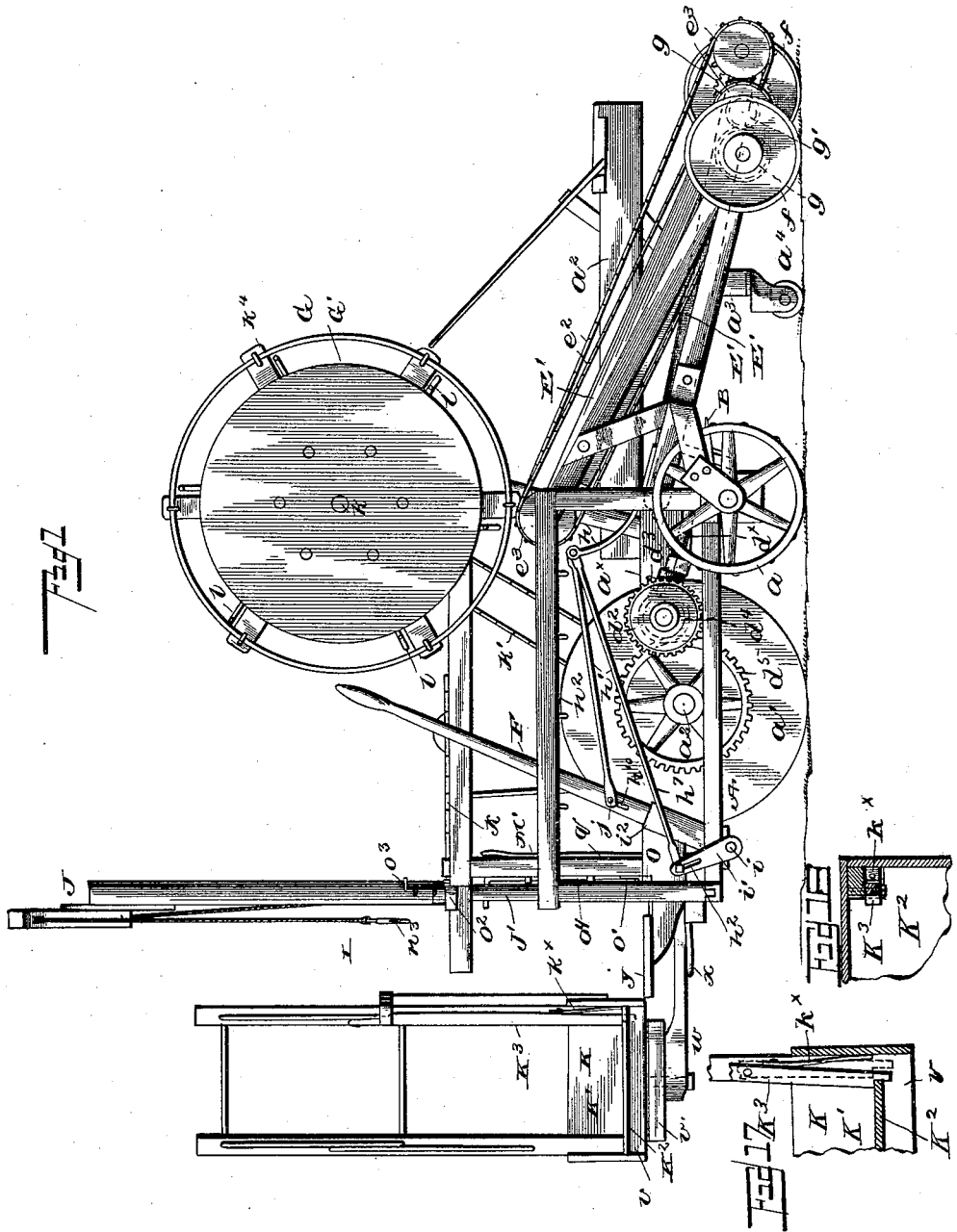
Witnesses
John Drivie
N. E. Bowen
Inventor
Joseph T. Hess
By his Attorneys
Myers & Co.

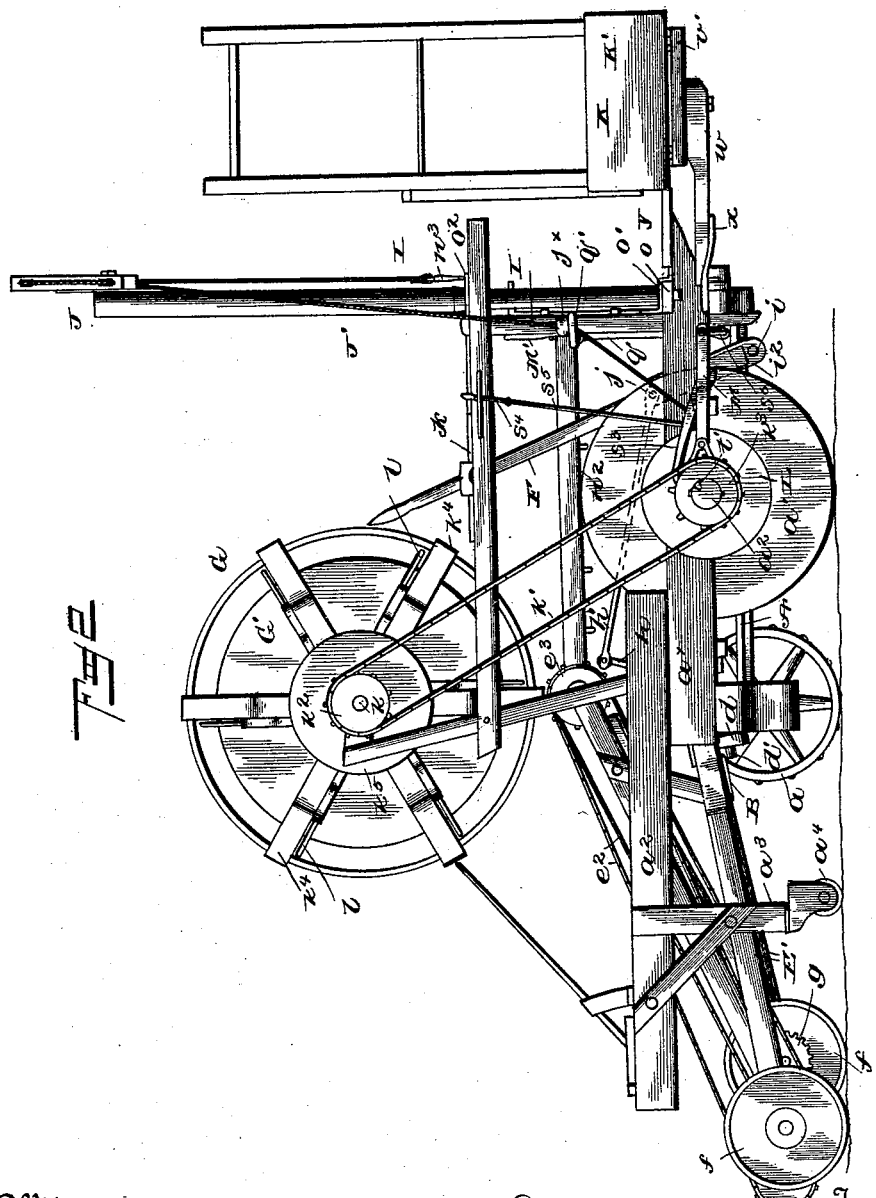

(No Model.) 5 Sheets—Sheet 3.
J. T. HESS.
CORN HARVESTER.
No. 479,165. Patented July 19, 1892.
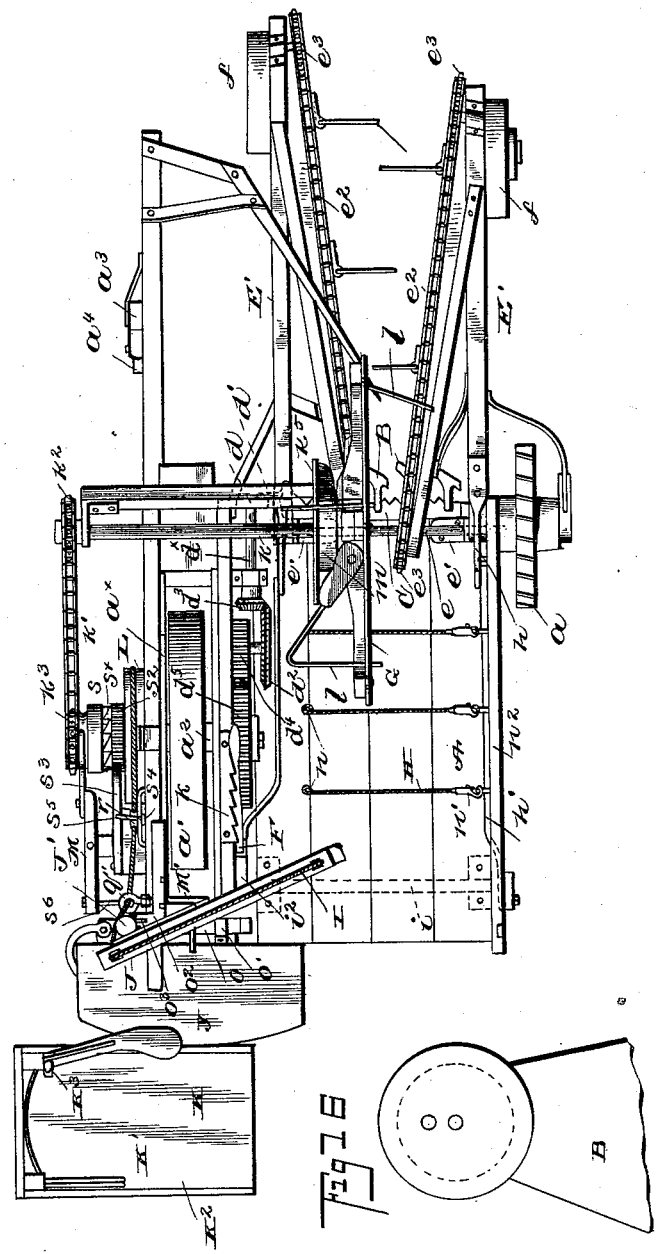
Witnesses Inventor
Joseph T. Hess
By his Attorneys (No Model.) 5 Sheets—Sheet 4.
J. T. HESS.
CORN HARVESTER.
No. 479,165. Patented July 19, 1892.
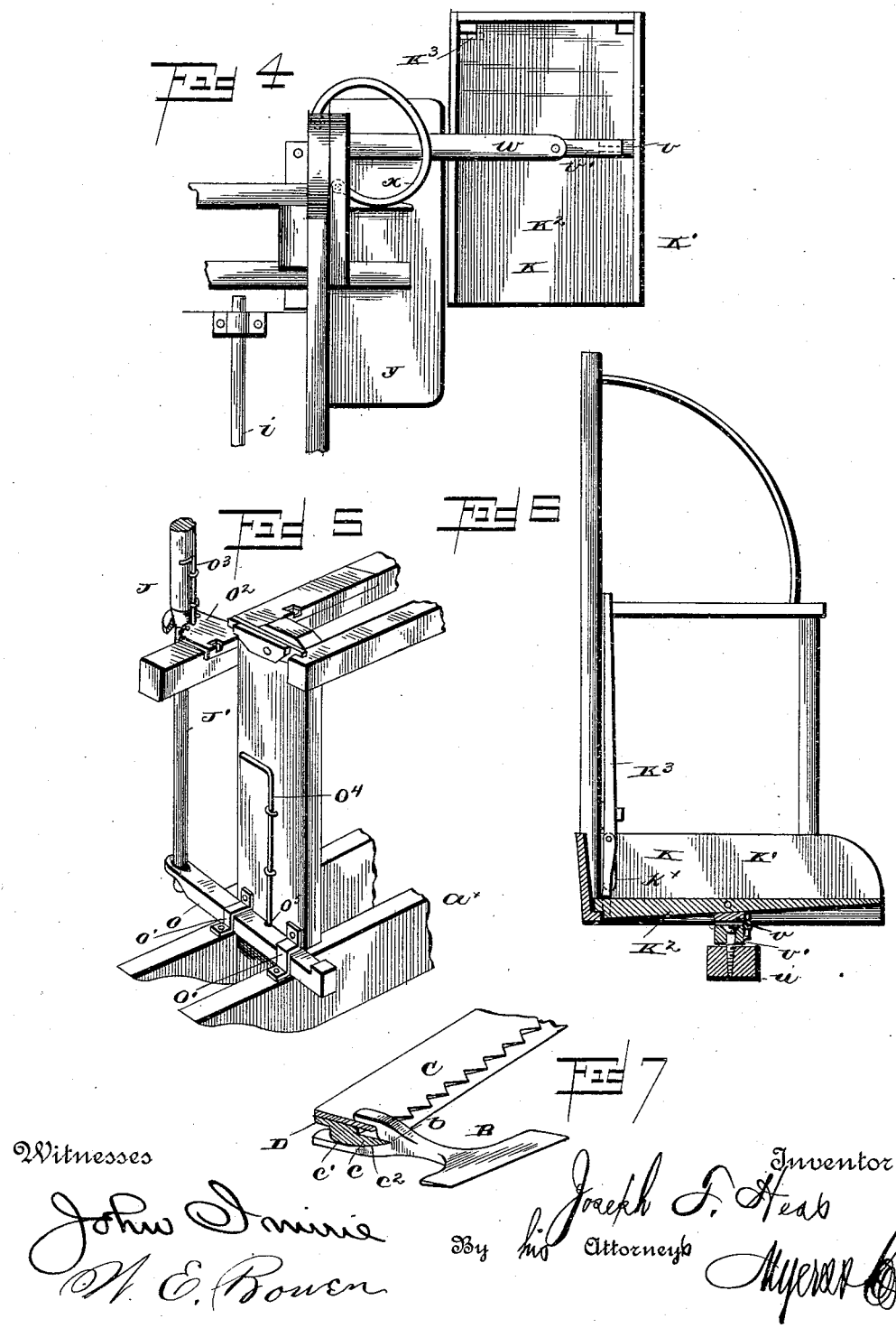

(No Model.) 5 Sheets—Sheet 5.
J. T. HESS.
CORN HARVESTER.
No. 479,165. Patented July 19, 1892.
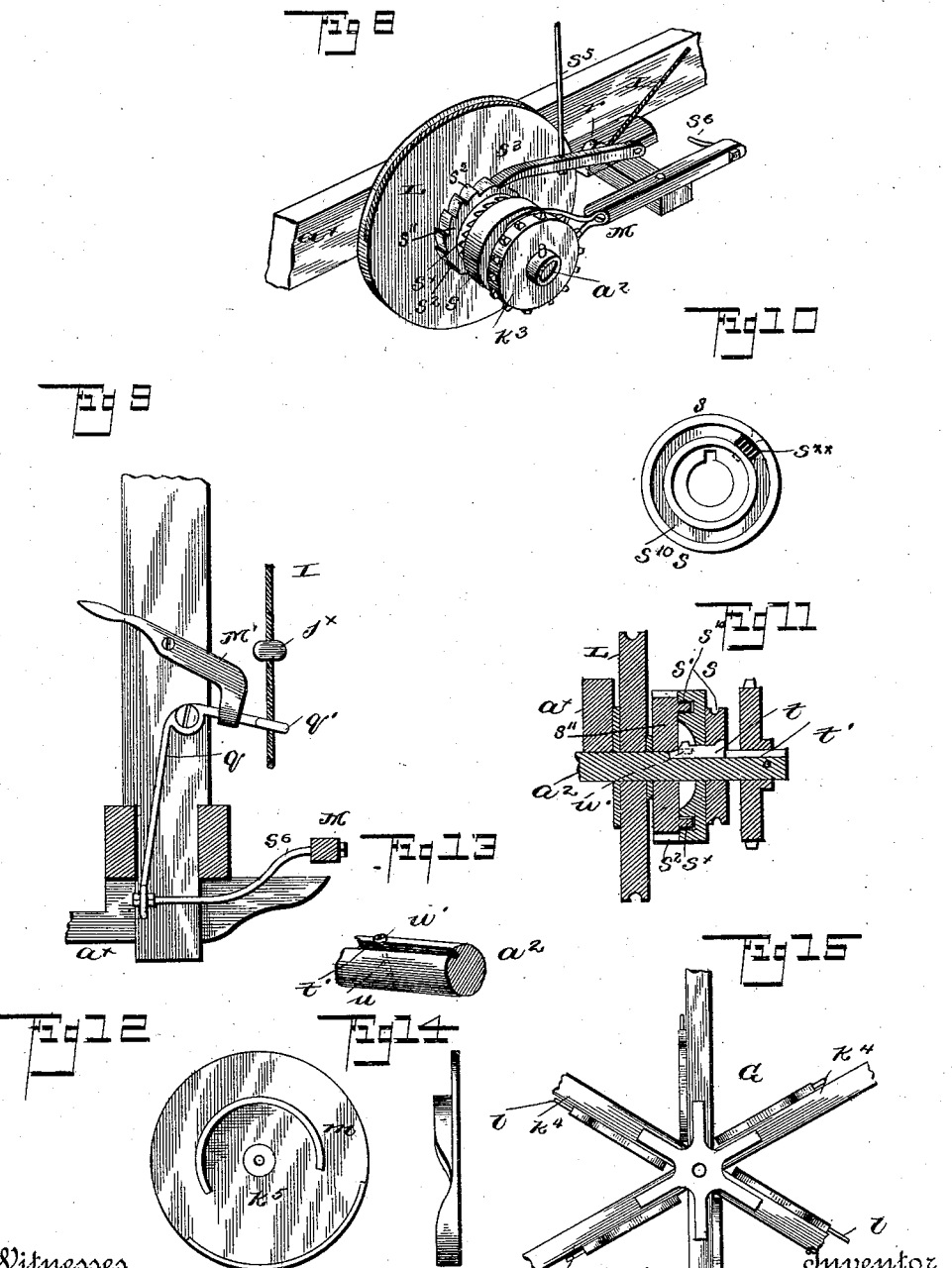

UNITED STATES PATENT OFFICE.

JOSEPH T. HESS, OF DUFFIELD'S, WEST VIRGINIA.

CORN-HARVESTER.

SPECIFICATION forming part of Letters Patent No. 479,165, dated July 19, 1892.

Application filed October 23, 1891. Serial No. 409,613. (No model.)

*To all whom it may concern:*

Be it known that I, JOSEPH T. HESS, a citizen of the United States of America, residing at Duffield's, in the county of Jefferson and State of West Virginia, have invented certain new and useful Improvements in Corn-Harvesters, of which the following is a specification, reference being had therein to the accompanying drawings.

My invention relates to improvements in corn-harvesters, having various objects in view, among them to provide for the formation and expeditious manipulation of the shocks of corn and the advantageous dropping of the shocks and the stacking of the initial shocks, while the subsequent shocks or corn may be dropped loose with the stacked corn or shocks, propping the same in windrow fashion on the ground; to secure the required adjustment of the shock-manipulating crane, according as to the distance it is required to swing the shock from the harvester; to provide for shifting the position of the shock-receiver or stand with relation to the line of travel of the machine; to effect the ready tilting, either of the shock-receiver or stand itself or of the bottom thereof in dropping the shocks or corn.

To these ends the invention consists in the sundry combinations of parts, substantially as hereinafter disclosed, and as pointed out in the claims.

In the accompanying drawings, Figure 1 is a side elevation of my improved corn-harvester. Fig. 2 is an opposite side view of the same. Fig. 3 is a plan view thereof; and Figs. 4, 5, 6, 7, 8, 9, 10, 11, 12, 13, 14, 15, 16, 17, and 18 are various detailed views of the invention, all of which will be clearly identified from the subsequent explanation.

In the embodiment of my invention I employ, as usual, the platform A, suitably mounted upon the large wheel $a'$, whose shaft $a^2$ is suitably journaled upon the under side of the platform-frame, and at the right-hand forward end corner upon a small wheel $a$, whose axle is also journaled upon said platform-frame. To the framework $a^x$ of the harvester is secured a draft-bar $a^2$. Preferably connected to it is a pendant or support $a^3$, the lower end of which is provided with a caster-wheel or roller $a^4$, resting on the ground.

At the forward end of the platform A is secured the series of interspaced fixed cutters or knives B, said knives having their cutting-edges arranged obliquely to the line of travel or movement of the machine, and seated in sockets or recesses $b$ in the shanks of said knives or cutters in rear of said cutters or knives is the usual reciprocating cutter-bar C. Below the usual cutter-bar C, however, and upon which it is directly supported, is arranged a plate D, having projecting from its forward edge a series of tooth-like projections $c$, having their under sides thickened or made convex, as at $c'$, with the thickened or convex surfaces or portions fitting in corresponding cavities $c^2$ in the shanks of the knives or cutters B. From this arrangement it will be seen that the stalks or corn are subjected first to a shear cut from the oblique-edged knives B, and if not entirely severed by the latter they will be exposed to the subsequent cutting action of the cutter-bar C, thus insuring, as well as expediting, the cutting operation. The cutter-bar is actuated or reciprocated in the ordinary manner by an eccentric and pitman connection $d\ d'$, the eccentric being carried by a shaft $d^x$, suitably journaled upon the platform A and having a beveled pinion $d^3$, meshing with a corresponding pinion $d^2$, whose shaft is suitably supported upon the platform and carries an additional pinion or cog $d^4$, meshing with the large gear-wheel $d^5$ on the shaft of the driving or transporting wheel $a'$.

E is the stalk or corn elevator, consisting of two V-shaped-like frames E', having their lower limbs pivoted at their rear ends upon a cross-rod $e$, supported in brackets or supports $e'$, secured upon the forward end of the platform A, and of endless chain belts $e^2$, encompassing sprocket-wheels $e^3$, journaled upon said frames at their forward or lower and upper or inner ends, respectively. These frames, with their endless chain belts, are arranged sufficiently close to permit the cut corn to fall crosswise of the same and be elevated jointly thereby. The lower or forward ends of the frames E' are borne by trucks or wheels $f$, traveling upon the ground and carrying gear-wheels $g$, geared to similar wheels $g'$, carried by the journals of the sprocket-wheels $e^3$ of the endless chain belts $e^2$ for driving the latter.

To the upper surfaces of the lower limbs of the frames $E'$, at their inner ends, are bolted or fastened the flat or plate-like ends of arms $h$, having connection, preferably, by rods $h'$, one with a short lateral projection $i'$ at one end of a rock-shaft $i$, journaled in bearings fixed to and beneath the platform A, and the other with a lateral stud $j$ on a hand-lever F, preferably bolted to a short arm $i^2$ at the opposite end of said rock-shaft. The rods $h'$ pass at their rear ends loosely through apertures or slots $h^2$ in the projection $i'$ of rock-shaft $i$ and $h^{10}$ in lever F, respectively, and are headed or nutted thereat to allow them limited play to permit the elevator E to automatically accommodate itself to unevenness in the ground without liability of breaking the parts. The lever F, having engagement with a rack $k$, secured to the framework of the machine for its retention at the required point of adjustment, is designed to be actuated when it is desired to elevate for any reason the corn or stalk elevator E.

G is the reel for aiding the discharge or removal of the corn or stalks from the elevator E in its passage upon the platform, and it has a disk or plate $G'$, secured upon or to a central shaft $k$, suitably journaled in a standard or upright of the framework of the machine and driven by an endless chain belt $k'$, encompassing sprocket-wheels $k^2$ $k^3$, secured to said shaft and the shaft $a^2$, respectively.

To the radial arms $k^4$ of the reel G are pivoted angular or bent arms $l$, adapted to extend beyond the periphery of the disk or plate $G'$ to act upon the corn or stalks, and upon the shaft $k$ is secured a second disk or plate $k^5$, having upon its inner side cams $m$, adapted to project said bent arms as they approach and permit them to strike the stalks or corn. Said arms as they are carried rearward by the reel being disengaged from said cams are free to be retracted or withdrawn from the corn or stalks.

In the path of the approaching corn or stalks and directly under the reel G is arranged upon the platform A a number of lengths of twine H to receive the falling stalks, and the ends of which twine are provided with rings and hooks $n$ $n'$, respectively, the hooks being adapted to engage an eye in a rail-piece $n^2$ of the framework of the machine, and the hooks adapted to be successively engaged with the shock or gavel elevating-rope I, also having upon its free or dangling end a hook $n^3$. This arrangement permits, by first connecting the nearer end of the rearmost length of twine H with the free end of the rope I, and after the accumulation of the requisite amount of stalks for a shock engaging the opposite end of said twine with said rope farther up, the ready manipulation of the shock or gavel, as it is elevated and swung around by the crane J and deposited in the shock receiver or stand K; also, by having a series or number of lengths of twine so disposed a length or lengths of twine or other suitable medium will always be in position to receive the subsequent falling stalks for the formation of an additional shock while the previous shock is being disposed of.

The crane J, located at the left-hand corner of the machine, consists of an axially-pivoted standard $J'$, revolubly held at its lower end in a slide $o$, itself held to the framework of the machine by straps or keepers $o'$ $o'$ and passing through a bracket $o^2$ on the framework $a^x$ and having a bolt $o^3$, adapted to engage the said bracket for the proper retention of the standard against rotation. The slide $o$ is held in its normal position—that is, so as to retain the standard J in exactly a vertical position—by a bolt $o^4$, suitably held in keepers upon the framework $a^x$ and adapted to engage a notch $o^5$ in said slide. The standard $J'$ is thus with the movement of the slide $o$, which, it is obvious, allows the changing of the position of the base of said standard, permitted to be more or less careened or inclined, as may be desired, in advantageously disposing of the shock or stalks with relation to the subsequent or return movement of the machine. The rope I of the crane J, which is provided with a stop $j^x$, after passing, as usual, over pulleys on the horizontal arm of the crane, passes down through a guide-eye $q'$ of a right-angled lever $q$, pivoted upon the framework $a^x$ of the machine, and thence hung in a bracket $r$, secured to said framework, and thence over and secured to a pulley or drum L at its end.

Upon the shaft $a^2$ is a clutch-box $s$, having a peripherally-grooved neck $s'$ upon one side, and in the opposite side of said clutch-box is an annular groove $s^{10}$, provided with a ratchet-pinion $s^{xx}$, which is engaged by a ratchet or toothed flange $s^x$ on one side of a disk $s^{11}$, secured to the pulley L, said disk also having on its periphery a ratchet $s^2$, with which engages a pawl $s^3$, having a lifting-lever $s^4$, connected by a rod $s^5$ to said pawl. With the neck $s'$ of the clutch-box $s$ is adapted to be engaged, by its arms or branches, a shipping-lever M, suitably pivoted on the framework $a^x$ of the machine.

To the shipping-lever M is connected by a rod or wire $s^6$ the lever $q$, and connected to the lever $q$ is a short supplemental lever $M'$, pivoted upon the framework of the machine and capable of acting upon the upper end of the aforesaid lever $q$ by the operator pressing downward upon it, (lever M,) which has the effect to slide the clutch-box upon the axle $a^2$ and cause the engagement of the same with the pulley and thus throw the pulley into motion. The pulley L when thus put into motion causes the winding thereon of the shock-elevating rope I until the stop $j^x$ engages the eye $q'$ of the lever $q$, the continued pressing of said stop against said eye actuating the lever $q$ and unshipping the clutch and stopping the winding of the rope, permitting the holding of the shock suspended until the pawl $s^3$ is disengaged from the ratchet $s^2$, when, after tying or shocking the corn, it may be lowered into the shock-receiver or be dropped to the ground, it being understood that the initial or first two bundles of corn are shocked and interlocked at the upper ends and thus stood in the field, the remaining corn being dropped loose in windrow fashion and braced in position against the shocked corn.

The clutch-box $s$ has a spline or key and groove connection $t\ t'$ with the axle $a^2$ to permit it to slide thereon and yet partake of its rotation, and transversely inserted into this axle just at one side of the groove $t'$ is a pin $u$, carrying a frictional roll $u'$, against which slides the feather or spline $t$, carried, as it is, by the clutch-box $s$, thus reducing friction to a minimum and facilitating the shipping or shifting of the clutch-box.

The shock receiver or stand K consists of a receptacle $K'$, adapted to conveniently receive the shocks of corn, as before stated, in standing position, and having a tilting bottom $K^2$, detachably held in position by a trip-lever $K^3$, pivoted to one of the uprights of said receptacle and having its lower notched end held by a spring $k^\times$, fastened thereto in engagement with the inner edge of a notched portion of said bottom.

The receptacle $K'$ has secured to its under side a cross-bar $v$, which is hinged or pivoted at one edge to a second cross-bar $v'$, centrally pivoted to the outer end of a bar $w$, in turn pivoted at its inner end to a suitable bracket of the framework $a^\times$ of the machine, said bar $w$ being adapted to be upheld by a segmental bar $x$, secured to said bracket. This arrangement permits the shock receiver or stand to swing horizontally, also the tilting of the same, according to the movement required in manipulating the shocks of corn and finally disposing of it.

Alongside of the shock receiver or stand is secured at the rear end of the framework $a^\times$ of the machine the operator's platform $y$.

Having thus fully described my invention, what I claim, and desire to secure by Letters Patent, is—

1. The corn-harvester having the series of knives or cutters arranged in front of the usual cutter-bar and having oblique cutting-edges and adapted to transversely receive through their shanks said cutter-bar, substantially as and for the purpose set forth.

2. The corn-harvester having the corn or stalk elevator comprising the pivoted V-shaped-like frames having secured to their rear ends arms, in combination with the rock-shaft and hand-lever having a slot-and-rod connection with said arms, adapted to have a limited movement independent of said rock-shaft and hand-lever, substantially as specified.

3. The corn-harvester having the crane comprising the axially-pivoted standard, in combination with a slide supporting said standard at its lower end and a bracket supporting said standard a short distance upward from said slide, substantially as set forth.

4. The corn-harvester having the crane and the shock or corn elevating rope or other suitable medium having a stop, in combination with the pulley or drum to which one end of said rope is connected, and the clutch-box adapted to engage said pulley and cause it to revolve with the transporting wheel-axle, and the clutch-box shipping-lever actuated by a supplemental lever, itself actuated by said stop on the elevating-rope, substantially as described.

5. The corn-harvester having the shock receiver or stand having secured to its under side a cross-bar $v$, hinged or pivoted at one edge to a second cross-bar $v'$, centrally pivoted to the outer end of a bar $w$, pivoted at its inner end to a bracket or support of the framework of the machine, in combination with a segmental bar secured to said bracket and supporting the bar $w$, substantially as set forth.

In testimony whereof I affix my signature in presence of two witnesses.

JOSEPH T. HESS.

Witnesses:
W. F. ALEXANDER,
R. M. LOCKE.